(12) United States Patent
Shloosh et al.

(10) Patent No.: US 10,902,671 B2
(45) Date of Patent: Jan. 26, 2021

(54) SYSTEM AND METHOD FOR CONSTRUCTION 3D MODELING AND ANALYSIS

(71) Applicant: MANAM APPLICATIONS LTD., Caesarea (IL)

(72) Inventors: Gilad Shloosh, Caesarea (IL); Avihu Shagan, Caesarea (IL)

(73) Assignee: MANAM APPLICATIONS LTD., Caesarea (IL)

( * ) Notice: Subject to any disclaimer, the term of this patent is extended or adjusted under 35 U.S.C. 154(b) by 0 days.

(21) Appl. No.: 16/675,490

(22) Filed: Nov. 6, 2019

(65) Prior Publication Data
US 2020/0074730 A1    Mar. 5, 2020

Related U.S. Application Data

(63) Continuation-in-part of application No. PCT/IL2018/050490, filed on May 6, 2018.
(Continued)

(51) Int. Cl.
*G06T 17/00* (2006.01)
*G01S 17/89* (2020.01)
(Continued)

(52) U.S. Cl.
CPC ........... *G06T 17/00* (2013.01); *G01S 17/89* (2013.01); *G06K 9/00208* (2013.01); *G06K 9/00637* (2013.01); *B64C 39/024* (2013.01)

(58) Field of Classification Search
CPC ..................................................... G06T 19/00
See application file for complete search history.

(56) References Cited

U.S. PATENT DOCUMENTS

| 7,995,055 B1 | 8/2011 | Ma et al. |
| 9,129,355 B1 | 9/2015 | Harvey et al. |
| (Continued) | | |

FOREIGN PATENT DOCUMENTS

| WO | 2010026268 | 3/2010 |
| WO | 2013020143 | 2/2013 |
| WO | 2015105886 | 7/2015 |

OTHER PUBLICATIONS

International Search Report and Written Opinion of the Searching Authority, International Application No. PCT/IL2018/50490, dated Sep. 28, 2018.
(Continued)

*Primary Examiner* — Phi Hoang
(74) *Attorney, Agent, or Firm* — The Roy Gross Law Firm, LLC; Roy Gross

(57) ABSTRACT

A method and system for 3D modeling of a construction or structure based on producing a 3D image from digital 2D images of the construction or structure, transforming the 3D image to a data point cloud presentation, electing a collection of data points, identifying an object of the construction or structure that matches the collection of data points, attaching corresponding visual images to a record of the identified object and repeating these steps for any collection of data points until completing the construction of a 3D model based on a combination of all identified objects. This 3D modeling is based on photos obtained from digital photographing means mounted on a UAV (Unmanned Aerial Vehicle) and launched to survey the construction or structure.

16 Claims, 12 Drawing Sheets

Related U.S. Application Data

(60) Provisional application No. 62/502,680, filed on May 7, 2017.

(51) Int. Cl.
    *G06K 9/00*     (2006.01)
    *B64C 39/02*     (2006.01)

(56) References Cited

U.S. PATENT DOCUMENTS

| | | |
|---|---|---|
| 2014/0146173 A1 | 5/2014 | Joyce et al. |
| 2014/0336928 A1 | 11/2014 | Scott |
| 2015/0009301 A1 | 1/2015 | Ribnick et al. |
| 2015/0347872 A1 | 12/2015 | Taylor et al. |
| 2016/0203387 A1* | 7/2016 | Lee .......................... G06T 7/73 348/44 |
| 2017/0221226 A1* | 8/2017 | Shen ........................ G06T 7/80 |
| 2018/0136670 A1* | 5/2018 | Gurdan ................. B64D 47/06 |
| 2019/0196513 A1* | 6/2019 | Zhou .................... B64C 39/024 |

OTHER PUBLICATIONS

Higgens, Sean, "Aria's UAV Robot Scans Bridges Automatically", SPAR 3D Weekly Newsletter, http://www.spar3d.com/blogs/the-other-dimension/vol13no20-robotic-infrastructure-modeling-with-aria/ DOI Feb. 20, 2020.

\* cited by examiner

SYSTEM AND METHOD FOR CONSTRUCTION 3D MODELING AND ANALYSIS

CROSS REFERENCE TO RELATED APPLICATIONS

This application is a continuation-in-part (CIP) of PCT/IL2018/050490 filed on May 6, 2018, which claims priority to U.S. 62/502,680 filed on May 7, 2017. The contents of both applications are hereby incorporated by reference herein in their entirety.

TECHNICAL FIELD

The present invention pertains to 3D modeling of constructions such as buildings, bridges, highways and roads. More particularly, the present invention pertains to system and method for 3D modeling of and identifying defects in such constructions.

BACKGROUND

Gradual erosion and catastrophic fracturing of the infrastructures of constructions of different types are well-known phenomena that require constant monitoring, inspection and maintenance. Current methods for identifying damages in constructions heavily rely on human and heavy machinery resources, are expensive, time consuming and in the case of bridges and roads stop traffic for a significant length of time. Such methods are also limited in accessibility to parts of the construction, for example the foundations and lower surface of bridges.

Other methods are suggested in the art for overcoming the disadvantages of the traditional ones. Mainly, these methods rely on survey done by remote controlled drones, also known as UAV (Unmanned Aerial Vehicle), equipped with photographic means for taking pictures of the constructions at multiple angles and in different perspective and views. The pictures taken are used to construct a 3D image of the construction, which is then modeled and analyzed for identification of damages and fractures. Such systems and methods are described, for example, in U.S. Pat. No. 9,129,355 to Harvey et al. and US 2014/0336928 to Scott.

Harvey describes a system for assessing damage to infrastructures using UAV for capturing aerial images of the construction and a computing module that is configured to define location boundaries of an item of the infrastructure that is surveyed. Within the defined boundaries, the computing module compares the data points captured by the photographing means mounted on the UAV to parallel data points of an item in an intact reference infrastructure.

Scott describes system and method of automated inspection, modeling and analysis of infrastructures. A UAV equipped with a position tracking system and digital cameras is used to take a plurality of photos of a structure. Metadata such as position, orientation and timestamp are recorded along with and associated to each photo taken.

Then image processing and pattern recognition software analyzes the photos and generates a 3D model of the structure. Virtual inspection of the 3D model then follows. Scott apparently relies on pattern recognition software available at the time of making his invention. However, this leads to relatively low resolution and accordingly poor quality in the identification of items and defects in a structure due to the limited computational force of such software.

It is, therefore, an object of the present invention to provide a system and method with a different approach towards 3D modeling and significantly improved defect and damage identification in structures of different types.

It is yet another object of the present invention to provide a system and method for 3D modeling and defect and damage identification in structures that is object oriented and provides accurate results significantly more than those offered by the prior art.

It is yet another object of the present invention to provide such system and method which are significantly less expensive and more accurate than currently used and suggested systems and methods.

This and other objects and embodiments of the present invention shall become apparent as the description unfolds.

SUMMARY OF THE INVENTION

In one aspect, the present invention provides a method for 3D modeling of constructions or structures and identifying and monitoring defects in such constructions and structures. The method essentially comprises object-oriented 3D modeling and 3D analysis, where the modeling is based on identifying any particular object of a construction or structure by electing a collection of data points from a cloud of data points obtained by digital processing of images of the construction or structure, delimiting the collection of the selected data points to match to a suitable object from a library of objects related to the construction or structure, identifying the object, calculating probability of each data point to relate to the collection of data points that defines the identified object, filtering data points with lesser probability to be related to the identified object, recording the relative spatial position of the identified object in the cloud of points and attaching the correct visual images to the record of the identified object. This is repeatedly applied to any collection of data points in the cloud of data points, enabling the identification of the objects that make the construction or structure and eventually constructing the 3D model based on the combination of all objects, which are identified.

This method is essentially more suitable for high-resolution 3D modeling, which is based on a multitude of data points, specifically in the order of magnitude of millions. In one particular embodiment, typical numbers of data points that the method and system of the present invention are capable of processing range from 50 to 100 up to 500 millions. Such amount of points and information cannot be processed or modeled by automatic 3D modeling software, and therefore requires a different approach to overcome the difficulty in constructing a 3D model of and properly identifying defects in any construction or structure.

The images taken, display the construction or structure in a plurality of perspectives and angles. To unify them into a single 3D image and construct a 3D model, an assignment of relative coordinates to the surroundings is needed to locate the different parts of the construction or structure in space. Accordingly, each data point is assigned the coordinates that locate it in space relative to other data points in its vicinity and surroundings, which adds further information to the metadata that characterize each data point. Further, each point in the cloud of data points based on the images taken may also be characterized with other data such as color, shade and any other features, include those that can relate it to its surroundings, particularly neighbor data points. In one particular embodiment, the method further comprises comparing between data and metadata of neighbor data points, calculating the probability of relating them to a single object of the construction or structure and including them in or rejecting them out of the collection of data points that relate to that object above or below a selected threshold of probability, respectively. In still another particular embodiment, this filtering process of data points continues dynamically when matching a pattern of an object to a selected collection of data points until proper match is achieved.

In a further embodiment, the method of 3D object-oriented modeling comprises structure defects analysis. Defect identification and analysis is based on structured methodology and fixed procedures, supported by a semi-automated and automated defects detection and visualization that create synchronized work environment, includes location-based synched images, access to historical surveys and other data. The 3D modeling of the construction or structure, therefore, comprises recording data related to the defects which are identified. Accordingly, a status record is produced for the construction or structure, including the identified defects which are classified and quantified according to their location in the respective objects of the construction or structure. Other information is recorded in the identification records of the construction or structure, such as materials used to construct the structure, history of surveys, defects and treatments. This information improves a following evaluation step of the severity of the defects and its impact on the strength, durability and performance of the construction or structure.

In still another particular embodiment, a further step of recommendation for treatment follows the evaluation of any defect which is identified in any object. The recommendation step comprises assigning values to selected parameters that define the severity of a defect such as those listed above, weighting these values according to the selected weight values assigned for each parameter, weighting and calculating the total weighted value and assessing the impact of the particular defect on the durability and performance of the construction or structure. In still another particular embodiment, the contributions of all defects observed in all objects of the 3D model of the construction or structure are weighted together to obtain the total durability and performance of the construction or structure. Accordingly, two types of indices are issued. One is termed Critical Condition Performance Index that focuses on any selected defect, its severity and impact on the durability and performance of the construction or structure, for example the impact of a creeping fracture on the long term weight capacity of a bridge. The second index is termed Average Condition Performance Index that reflects the general structural status of the construction or structure according to the total weighted severity of all the defects.

These two indices essentially cover the major aspects of monitoring, supervising and treating a construction or structure. One aspect concerns the potential spread and development of a particular defect that may cause severe damage to the entire construction or structure. The second aspect concerns the accumulated impact of all defects on the durability and performance of the construction or structure.

In still another aspect, the present invention provides a system for object-oriented 3D modeling of and identifying and monitoring defects in constructions and structures. In one particular embodiment, such system comprises remotely operated and controlled light aerial UAV, e.g., drone, high-resolution digital photographing means, detection devices and orientation geo-location devices, which are configured to locate and identify the construction or structure selected for survey, e.g. IR sensors, GPS means, all mounted on the UAV, a remote control and data processing unit, which is configured to produce flight mission for the UAV and instructions for mapping and grating the construction or structure to be surveyed, digital storing means for storing images of the construction or structure taken by the digital photographing means (usually 2D images), digital data processing means for retrieving the stored 2D images and constructing a 3D image of the construction or structure based on the 2D images, means for transforming the 3D image to a cloud of data points, digital library of 3D patterns of typical objects of the construction or structure, means for matching a pattern of an object of the construction or structure to a selected collection of data points and digital data processing means for constructing a 3D model of the construction or structure based on the matching of 3D patterns to the cloud of data points.

Further to the above, the system of the present invention comprises a digital library of typical defects and damages in the construction or structure and means for identifying defects and damages in the selected object of the construction or structure. Such damages may be identified by visual, semi-automatic or automatic means in any particular image attached to any particular object of the 3D model. Accordingly, the system comprises display means for displaying the images attached to any object of the 3D model. Then the system lets the user to identify the defect or damage either independently or by using semi-automatic or automatic means of visual identification. In one further embodiment, such semi-automatic or automatic visual identification means comprise a defect type learning module that accumulates information on the correspondence between type of a defect and possible visual representation of such defect. This module is configured to provide the user with selected possible types of defects according to the images provided by the visual identification means. The user may then examine the suggested types of defects or damages, compare them with the images related to every type of defect or damage and verify, reject or amend the conclusion of the defect type learning module.

In accordance with the above, in one particular embodiment, the method of 3D object-oriented modeling comprises structure defect analysis. Defect identification and analysis is based on structured methodology and fixed procedures, supported by a semi-automated and automated defects detection and visualization that create synchronized work environment, includes location-based synched images, access to historical surveys and other data. The 3D modeling of the construction or structure, therefore, comprises recording data related to the defects which are identified. Accordingly, a status record is produced for the construction or structure, including the identified defects which are classified and quantified according to their location in the respective objects of the construction or structure. Other information is recorded in the identification records of the construction or structure, such as materials used to construct the structure, history of surveys, defects and treatments. This information improves a following evaluation step of the severity of the defects and its impact on the strength, durability and performance of the construction or structure.

In still another particular embodiment, the system of the present invention further comprises an evaluation module for evaluating defects identified in a construction or structure. Essentially the evaluation module is configured to assign values of different parameters attributed to any particular defect or damage and weight the contribution of the defect or damage to the strength, durability and performance of the construction or structure. Accordingly, the evaluation module is configured to produce two types of indices that reflect the state and performance of the construction and structure. One index is termed Critical Condition Performance Index that focuses on any selected defect, its severity and impact on the strength, durability and performance of the construction or structure, for example the impact of a growing fracture in the foundations of a bridge on the bridge's weight capacity. The second index is termed Average Condition Performance Index that reflects the general structural status of the construction or structure according to the total weighted severity of all the defects. For example, this index may be used to conclude long term integrity of a bridge.

These two indices essentially cover the two aspects of monitoring, supervising and treating a construction or structure. One aspect concerns the potential spread and development of a particular defect that may cause severe damage to the entire construction or structure. The second aspect concerns the accumulated impact of all defects on the durability and performance of the construction or structure.

In still another embodiment, the system of the present invention further comprises a recommendation module for recommending treatment following evaluation of a defect or damage which is identified in any object by the evaluation module. The recommendation module is configured to assign values to selected parameters that define the severity of a defect or damage such as those listed above, weighing these values according to selected weight values for each parameter, weighting and calculating the total value and assessing the impact of the particular defect or damage on the strength, durability and performance of the construction or structure. In still another particular embodiment, the recommendation module is configured to accumulate the contribution of all defects and damages observed and weight them together to obtain the total strength, durability and performance of the construction or structure.

Evaluation and recommendation further comprise the manufacturing of a grading sheet for the construction or structure that reflects the concept of 3D object-oriented modeling. Such grading sheet lists the defects and damages identified, their severity, quantity and description for every object in the model that represents a particular part of the construction or structure. The grading sheet may also list the images of the particular part of the construction or structure alongside the list of defects and damages and relate them to the 3D object that corresponds to that particular part.

In one embodiment, the construction or structure are selected from bridges, highways, roads, railways, pavements, above- and under-ground piping, facilities, plants, buildings and towers.

The invention provides holistic system and method for identifying and monitoring defects and damages in constructions and structures, particularly such that are highly inaccessible, using object-oriented 3D modeling and 3D analysis. The system and method replace heavy machinery, mounting cranes and human resources that are subjected to errors with remotely operated and controlled light aerial UAV and high-resolution cameras, detection devices such as sensors, e.g. GPS, lighting and infrared, mounted on them. The UAV and cameras save significant time and costs of onsite photographing of the constructions and structures and provide better access to practically every corner, providing high-resolution images of defects and damages in different parts and significantly improving the reliability, accuracy, and quality control of the surveys. A remote control and data processing unit is capable of producing flight mission for the UAV, mapping and grating the construction or structure to be surveyed. The flight missions' parameters are saved and can be activated for next surveys with a click of a button.

The following describes particular aspects and embodiments of the invention with reference to the accompanying drawings without departing from the scope and spirit of the invention.

DETAILED DESCRIPTION OF THE INVENTION

The following further details and exemplifies aspects and embodiments of the present invention with reference to the accompanying drawings.

Figure 1:
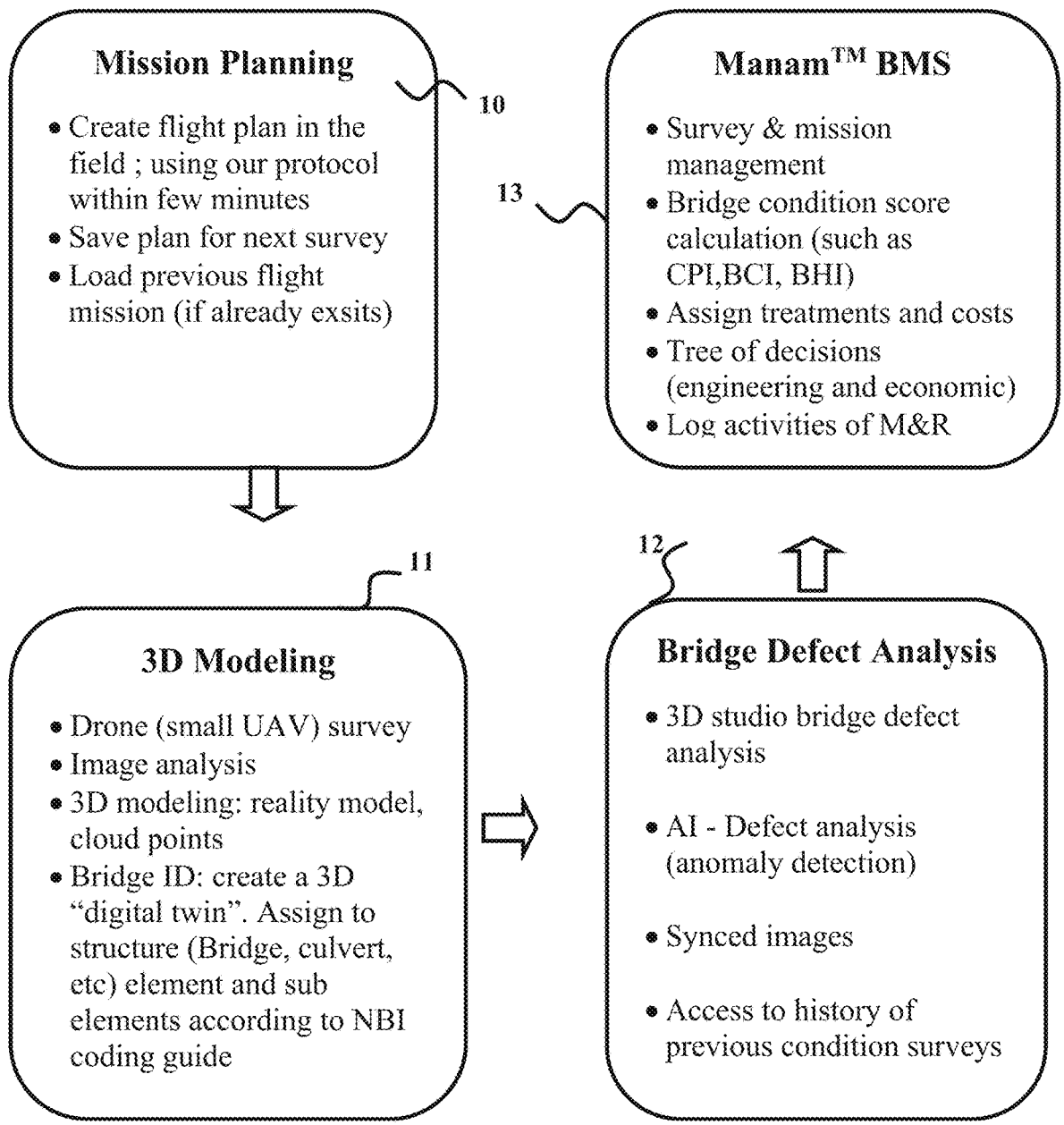
FIG. 1 is a flow diagram of the four major stages of 3D modeling of a construction and defect identification.

FIG. 1 presents the four major stages of the method of the present invention of object-oriented construction of a 3D model of and identification and scoring of defects and damages in a construction or structure. Mission planning for UAV is first created in stage (10). The flight mission may comprise identifying features of the construction or structure to be surveyed, coordinates of location of the construction or structure, dedicated time for survey, sequence of surveying the different parts of the construction or structure, maneuvers over and/or within the construction or structure to capture different perspectives and photographing program to take photos of the different parts at different perspectives. Another benefit of the method of the present invention is that the planning of the flight mission can be kept for future surveys, thereby saving costs of new planning and maintaining a sequence surveys that may be referenced to and compared between themselves. This may also benefit in a more reliable reference between the collected data in each survey, showing gradual or unexpected changes in the state of the construction or structure.

After obtaining the required visual data and collecting other metadata such as geo-location and relative location to the surroundings and between the different parts of the construction or structure, the method moves to stage (11) of downloading the survey results form the UAV to a digital data storage and processing computer device, constructing a 3D model and completing an ID for the structure, a bridge in this particular example. Stage (12) of the method concerns bridge defect analysis based on the images taken and the 3D model constructed. A studio, semi-automatic or automatic uploads images for every object selected of the 3D model that represents a particular part of the bridge. The system also provides access to historical data of the bridge, enabling to form a development line with time of defects and damages and improving the assessment of current state, strength, durability and performance of the bridge. The final stage (13) completes the defect analysis and identification by calculating proper critical and average performance indices for the bridge and recommendations for treatments.

Figure 2:
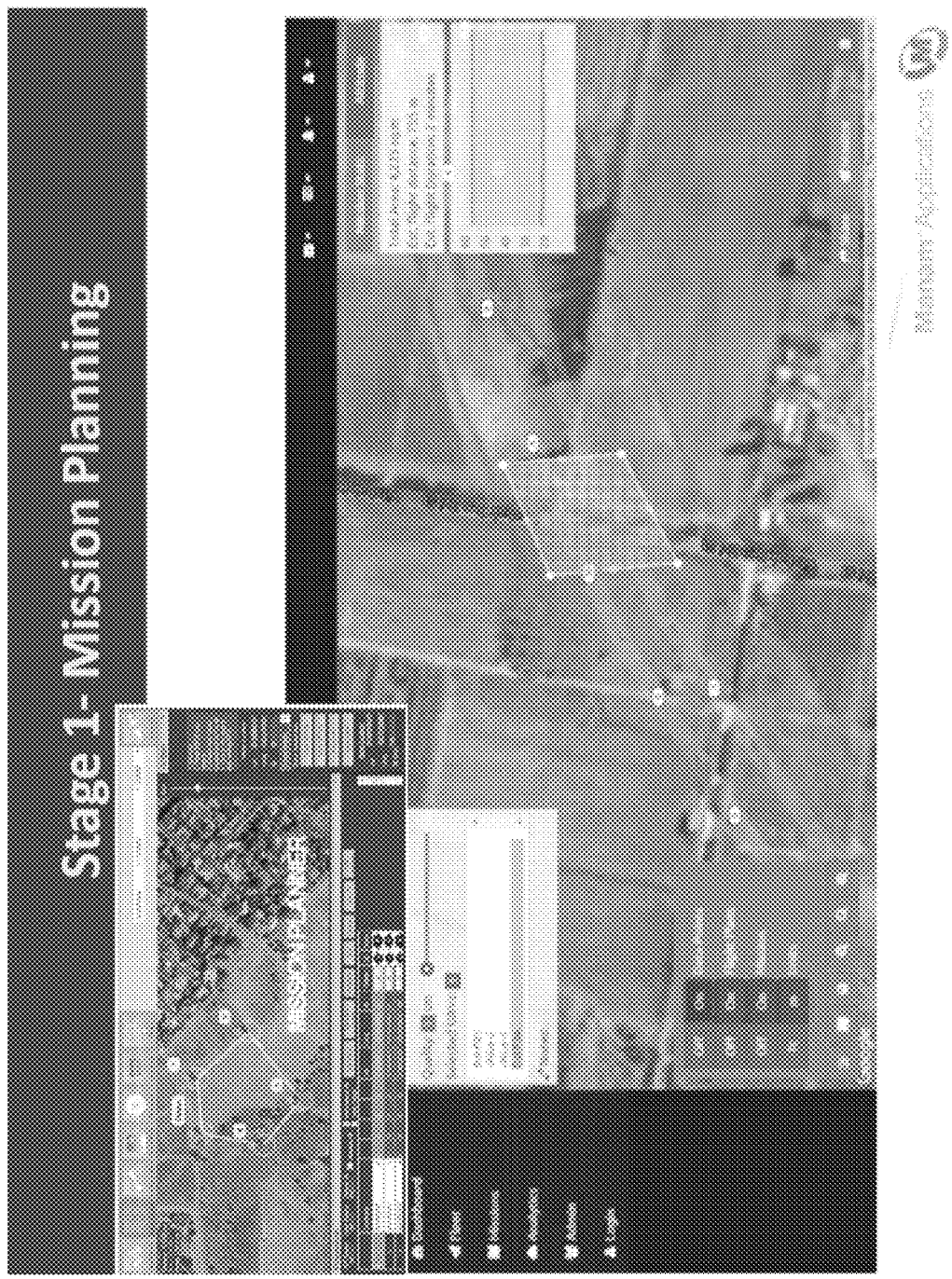
FIG. 2 shows implementation of mission planning for UAV.
Figure 4:
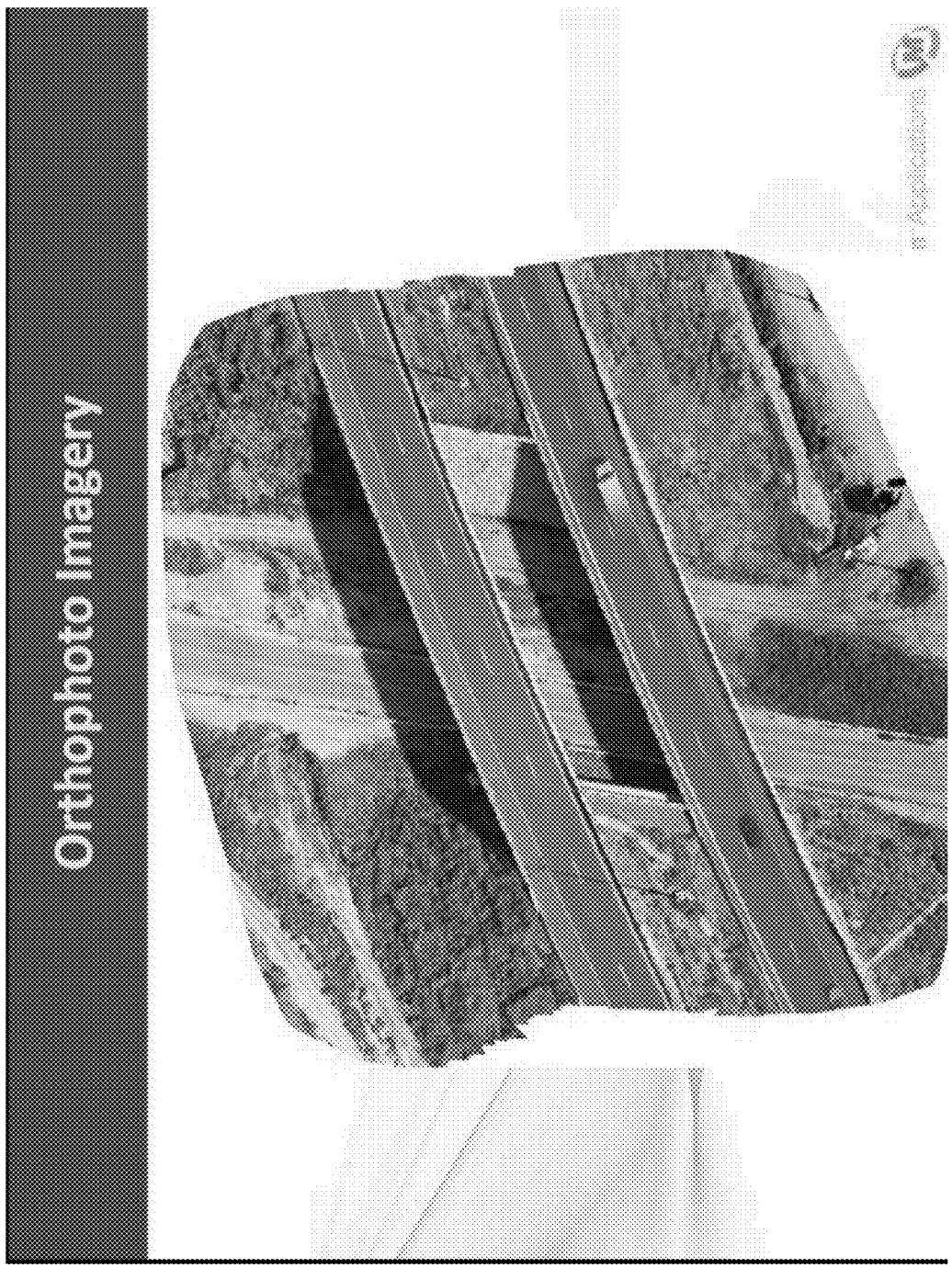
FIG. 4 shows imagery of a bridge as part of the method of the present invention.
Figure 10:
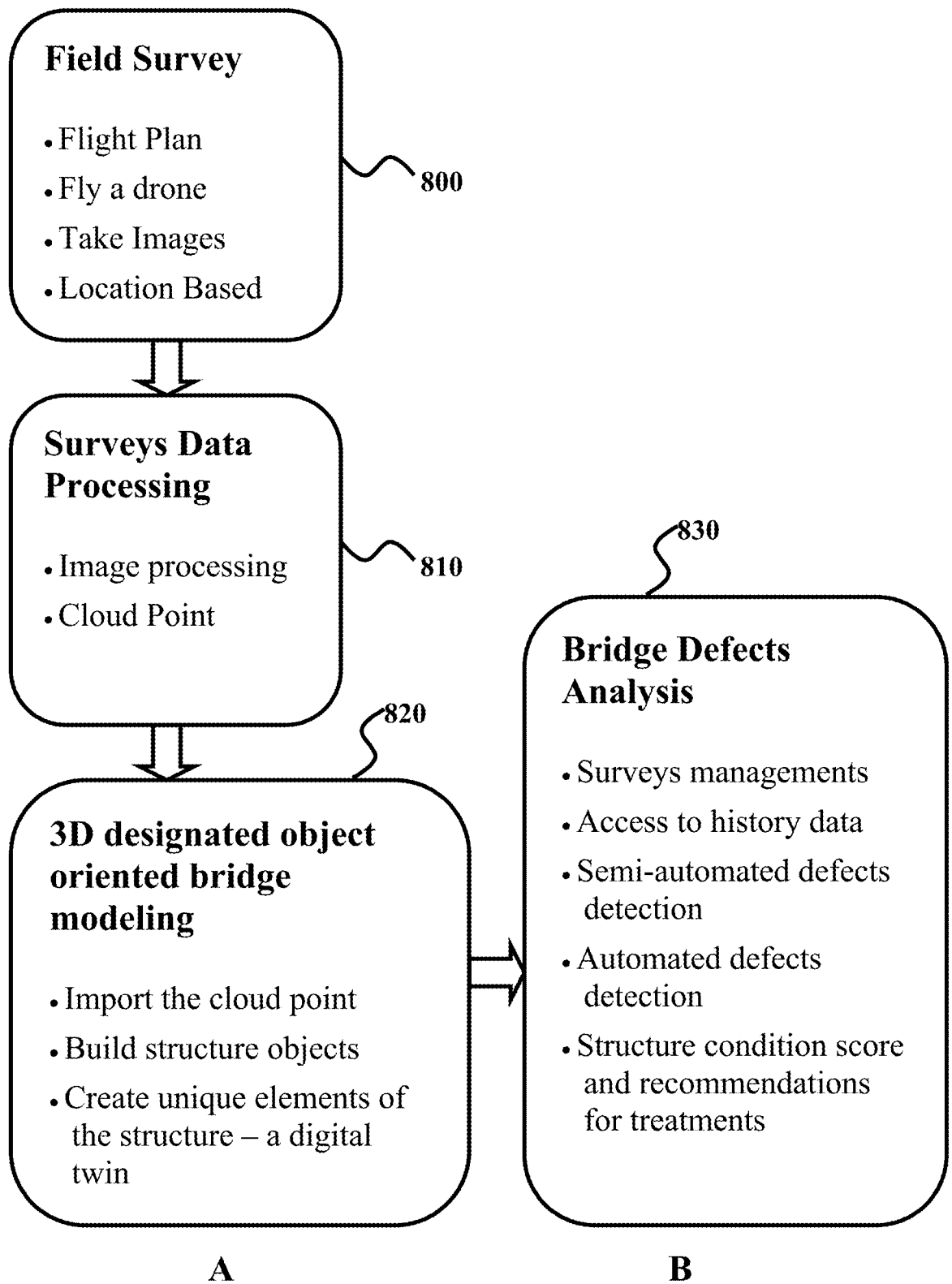
FIGS. 10-12 are flow diagrams that further detail the steps of object-oriented construction of 3D model of and identification of defects in a construction or structure.
Figure 11:
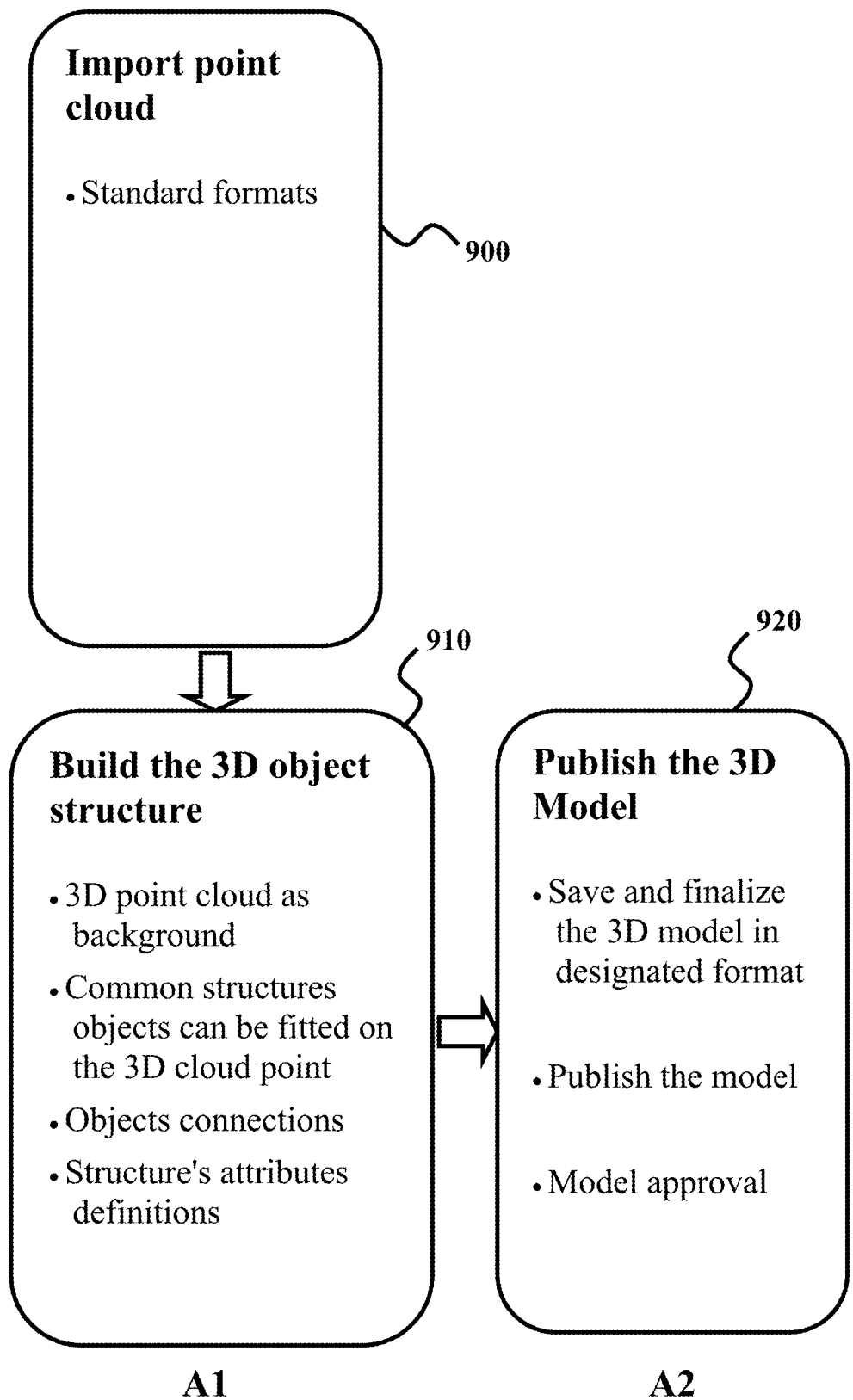
Figure 12:
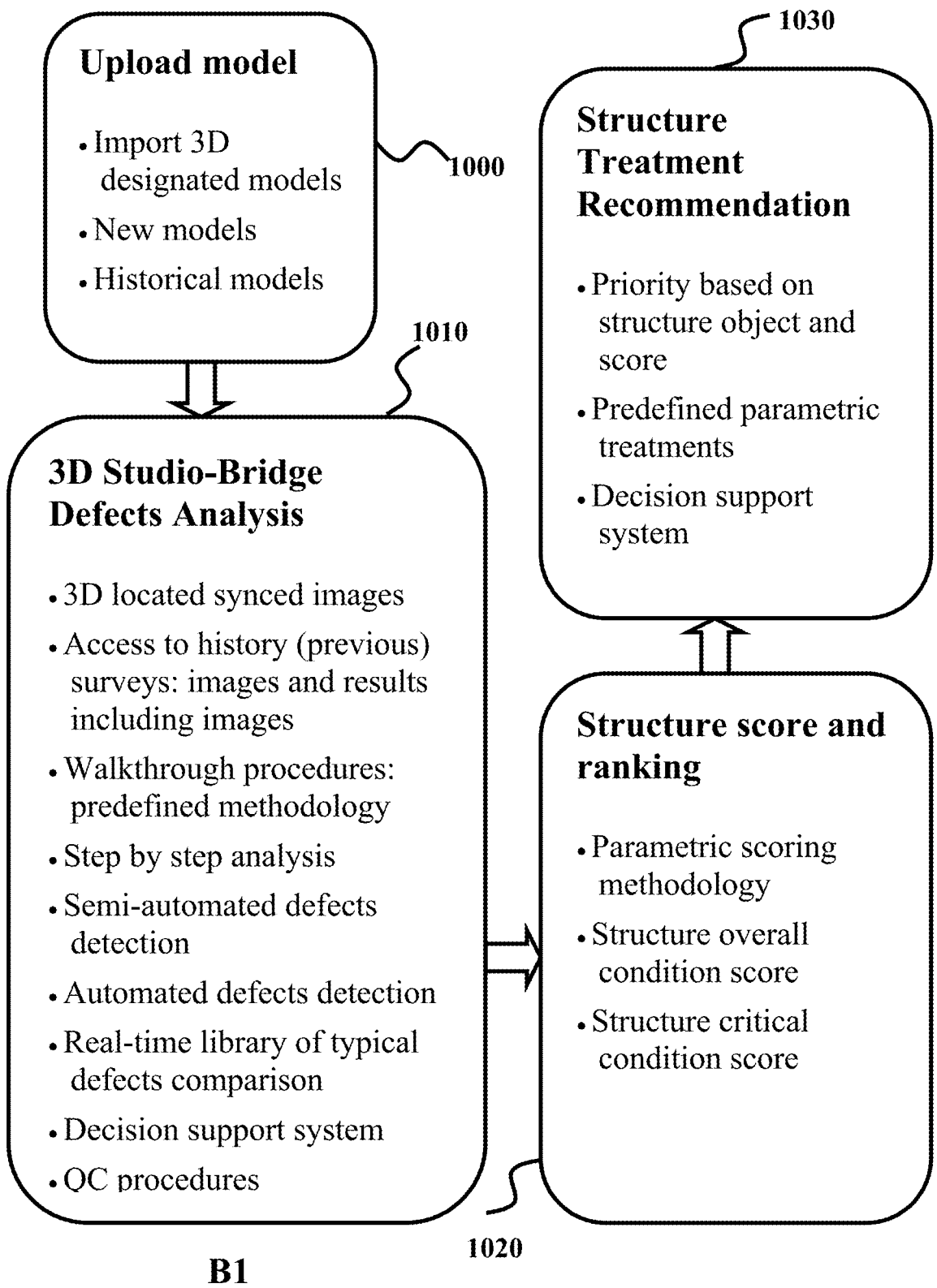

A more detailed and particular example of the method of 3D modeling of and defect identification and analysis in a construction or structure based on object-oriented approach is illustrated in the flow diagrams in FIGS. 10-12. As shown in FIG. 1, FIG. 10 also starts with preparation of flight mission, field survey and obtaining visual and location data relating to the particular structure selected (800), e.g., bridge. A visual presentation of an image of a bridge taken by digital camera mounted on a UAV is displayed in FIG. 2. The bridge is covered with a grid and geographic data are displayed in the caption at the top right of the image. The insert at the top left displays visual presentation of the mission, which is planned for this flight of the UAV, comprising delimiting boundaries for the area in which the bridge to be surveyed is located. Photo imagery of the bridge is displayed in FIG. 4 as a product of combination of the photos taken from different angles and perspectives. Surveys data processing based on the images of the bridge and forming a point cloud that corresponds to the bridge based on these images are then carried out as preliminary step for the construction of a 3D model of the bridge according to the object-oriented approach (810). The construction of the 3D model of the bridge (820) comprises the major steps of importing the point cloud, and constructing 3D objects that correspond to a selected collection of points in the point cloud on the one hand and a defined object of the bridge on the other hand, where that object corresponds to a defined part of the bridge.

Figure 3:
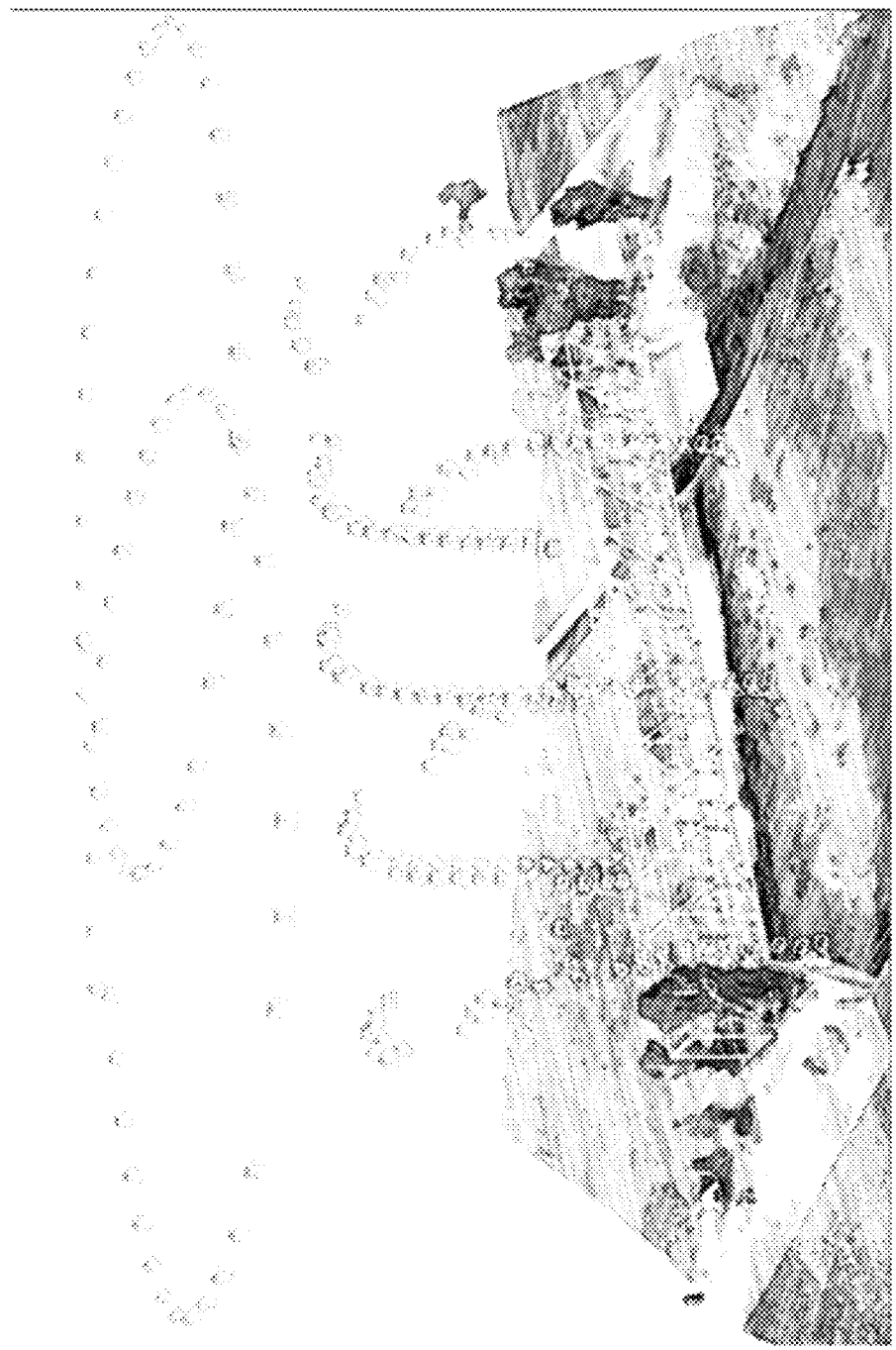
FIG. 3 shows a 3D view of UAV's location in the flight plan using patterns of circles and Façades.

The best practice for flight plan creation in order to achieve a reality hi-res (high resolution) model is illustrated in FIG. 3 that shows the flight path of the UAV orbiting around and above the construction or structure, e.g. a bridge. Accordingly, following our field tests and experience, we developed a methodology of flight plan for creating a 3D model. The table below lists the main steps which are important to create an appropriate 3D model, which implementation is shown in the maneuvering of the UAV in a defined path around the bridge as shown in FIG. 3:

| Stage | Flight plan | Technical Details |
| --- | --- | --- |
| 1- a "recon" flight | Circles- mapping orbits | Height: 50 m\165 ft approx.<br>gimbal pitch: −60<br>radius: depends on structure (2-3 circles)<br>overlap: 50%<br>Discrit ang.: 30 deg<br>30-70 images |
| 2- field analysis | 3d analysis<br>Set structures and obstacles | Create the bridge structure for the flight plan:<br>Set actual heights relative to ground and extend them.<br>Create:<br>Structures<br>Obstacles as structure |
| 3- flight plan | Mapping orbits | Select the desired polygons - structures only (without obstacles):<br>Flight alt.: 20-40 m\66-131 ft (from structure)<br>Gimbal pitch: −50 deg<br>Orbit Rad.: visual - twice bigger than specific structure<br>Orbit overlap: 50%<br>Discretization: 18 deg |
| | Façade Inspection | Select the desired façade in the structure:<br>Start alt.: 3-5 m\10-17 ft<br>Side offset: 7-15 m\23-50 ft<br>Top offset: 7-15 m\23-50 ft<br>Overlap Horizontal: 80%<br>Overlap Vertical: 80%<br>Side skew: 25-35%<br>Gimbal pitch: −90 deg |

Figure 5:
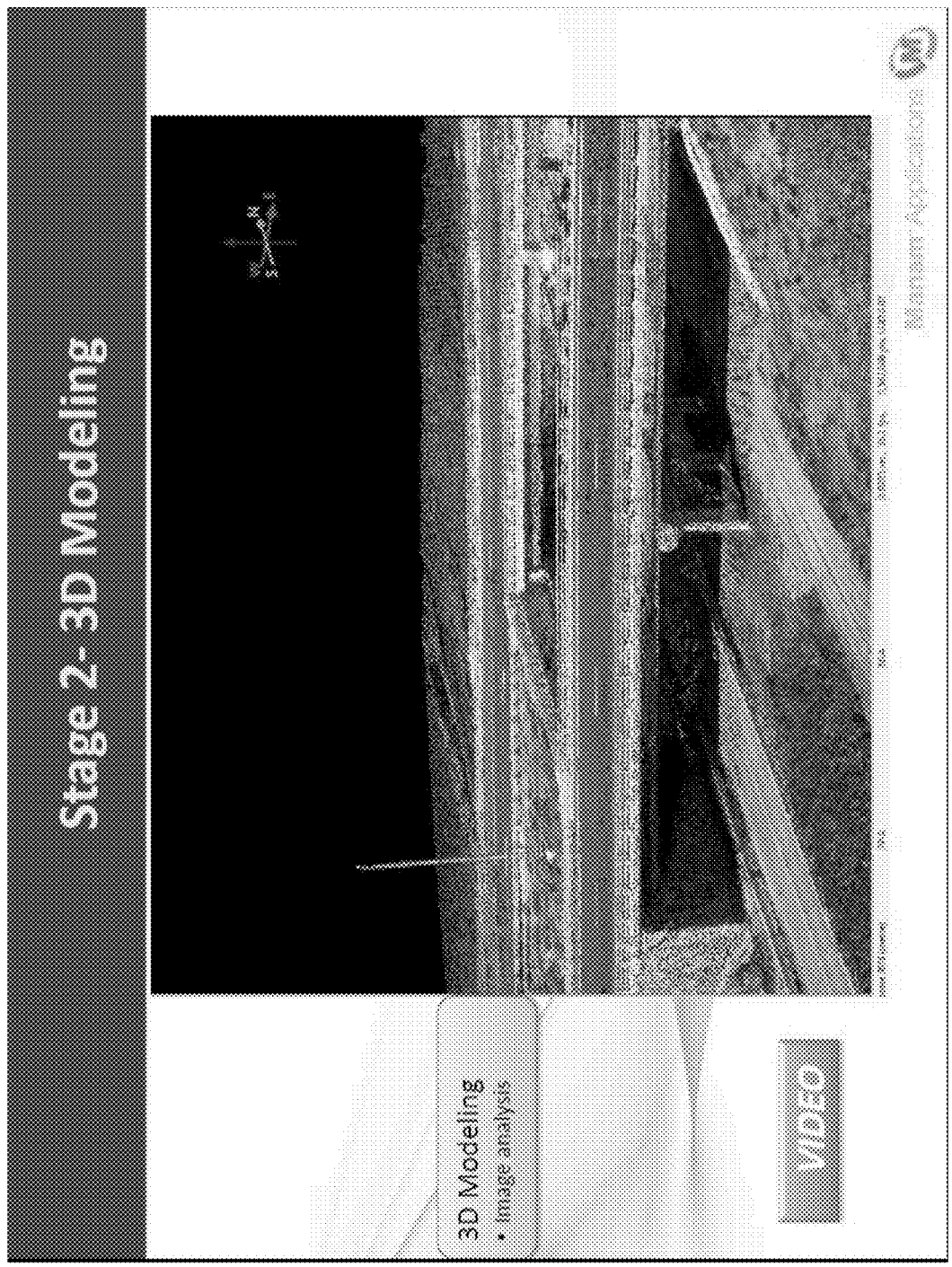
FIG. 5 shows generation of point cloud as part of 3D modeling of a bridge.
Figure 6:
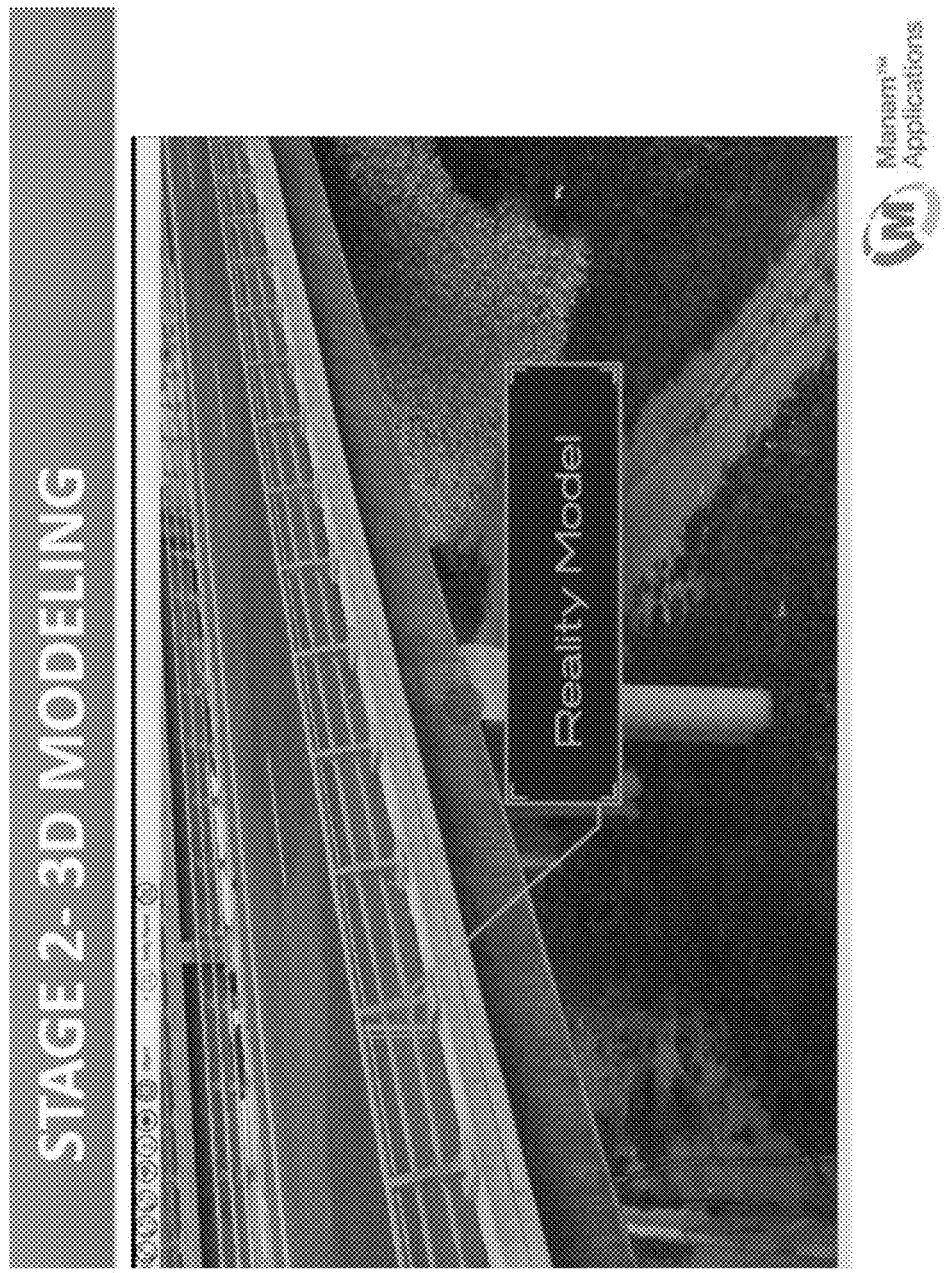
FIG. 6 shows generation of mesh as part of 3D modeling of a bridge.
Figure 7:
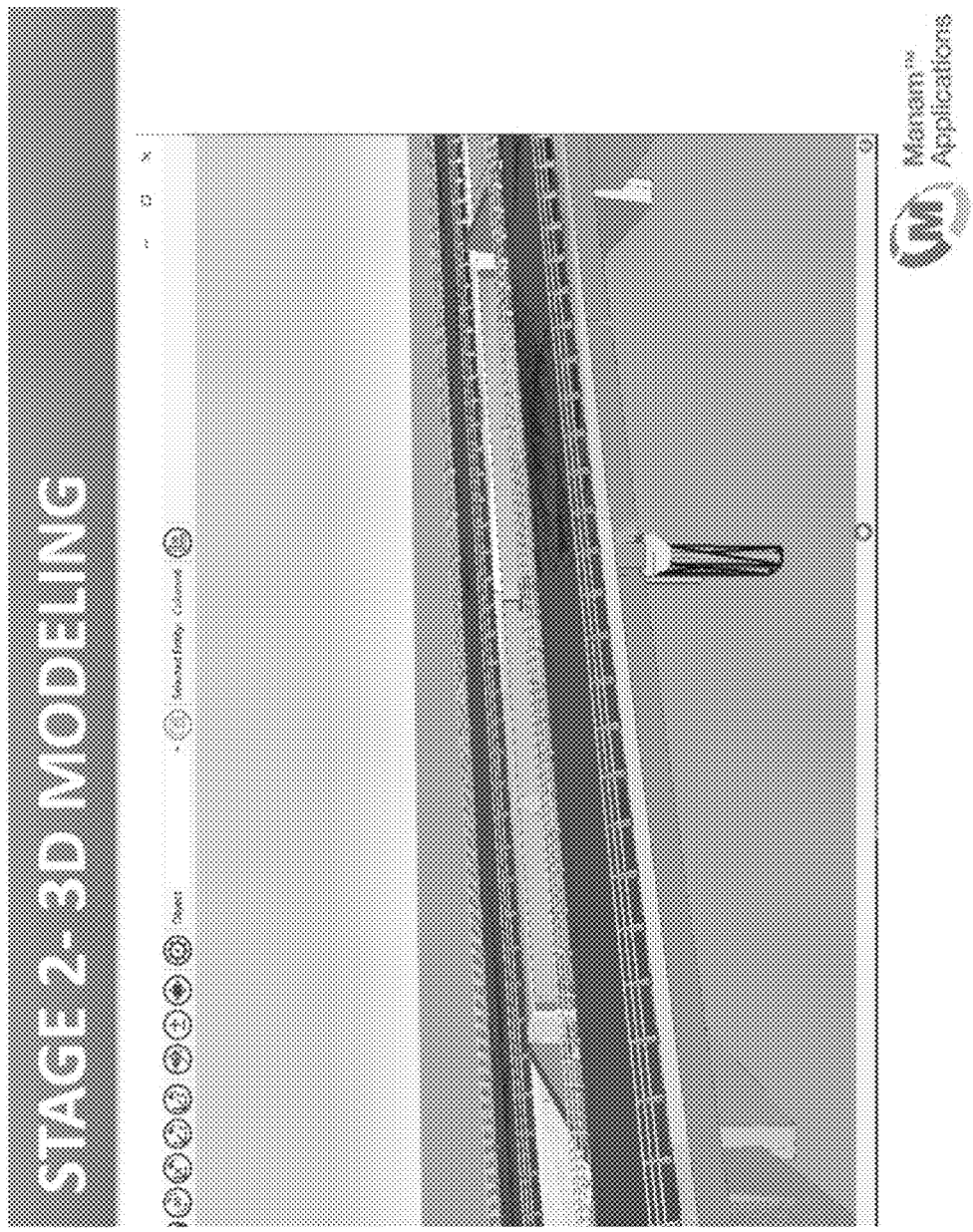
FIG. 7 illustrates object identification in a bridge as part of 3D modeling of a bridge.

FIG. 5 shows a pixelated image of the bridge in a point cloud format that makes the bridge as a first step of constructing the 3D model. The method of dynamic matching of the object to the particular part of the bridge is discussed above and comprises mainly the inclusion or rejection of points in any collection of data points according to shared features they may have based on data and metadata assigned for each point. Eventually an object that corresponds to the collection of data points in the point cloud is determined. Such object that corresponds to one of the bridge's pillars is illustrated in FIG. 7 in a progressing step of the 3D modeling.

Figure 8:
FIG. 8 illustrates defect identification in an identified object in a 3D model of a bridge.

Once the 3D model is constructed, defect identification and analysis may be carried out (830). In this respect, naked-eye, semi-automated or automated defect identification may be used, characterizing and recording the particular defect examined, searching a defect and defect type dedicated digital library for defects with similar characteristics to those attributed for the defect and comparing them to each other, uploading defects and defect types stored in the dedicated digital library that have characteristics similar to those of the examined defect, selecting the most similar type of defect to the examined defect and tagging it with an identification code for that type of defect. When completing the identification of all defects identified in the bridge, scoring of the bridge's strength, durability and performance of the bridge follow. Finally, recommendation for treatment is advised by the system of the present invention based on general assessment of the state of the bridge and identification of defects or damages, which are critical to its strength, durability and performance projected to be in any defined interval of time. FIG. 8 visually illustrates defect analysis carried out on a pillar of a bridge as modeled to the right. The left section in FIG. 8 shows an uploaded image of the bridge pillar with particular designation of the place where the particular defect is identified.

FIGS. 11 and 12 further detail particular steps that are mentioned in general in the flow diagram in FIG. 10. In FIG. 11, the importing and display of the point cloud may be done according to standard formats (900). The construction of a 3D object projected on any selected collection of points in the point cloud (910) takes into consideration the point cloud as a background for the fitting of the object to the collection of points. Such fitting may be done based also by considering the connections of the objects to neighbor objects and definition of attributes of the structure as reflected in the data carried by or assigned to every data point. Eventually, when construction of the 3D model of the bridge for example is complete, the model goes through a series of actions of saving, finalizing, approving and publishing, which are intended to set it as reference for the particular construction, i.e., bridge that is surveyed (920). Steps (910) and (920) are also designated A1 and A2 to indicate that the present more detailed actions of step (820), termed A, in FIG. 8.

FIG. 12 shows a more detailed flow of actions taken in the following steps of identifying defects and damages in the bridge, grading them and referencing particular images to them for visual inspection. Step (1000) is the initial step of this stage, importing the 3D model or models constructed in the previous stage. Previous and historical models may also be imported to enable identification and tracking of changes in the structure surveyed with time and development of particular defects and damages and overall state of the structure. A 3D bridge defect analysis then follows (1010), which may include part or all of the following actions: locating 3D images that correspond to a particular object in the bridge's model and display its visual, actual, corresponding part; accessing historical database of previous surveys for comparing visual and grading data; systematically guiding the user in a walkthrough approach to identification of defects and damages; providing a step-by-step analysis of the defects using, for example, naked-eye, semi-automated or automated defect detection; uploading a library of defect types for the identification of an observed defect in real-time; and providing a decision support system and quality control procedures for obtaining optimal identification and eventually grading of the defects observed.

Figure 9:
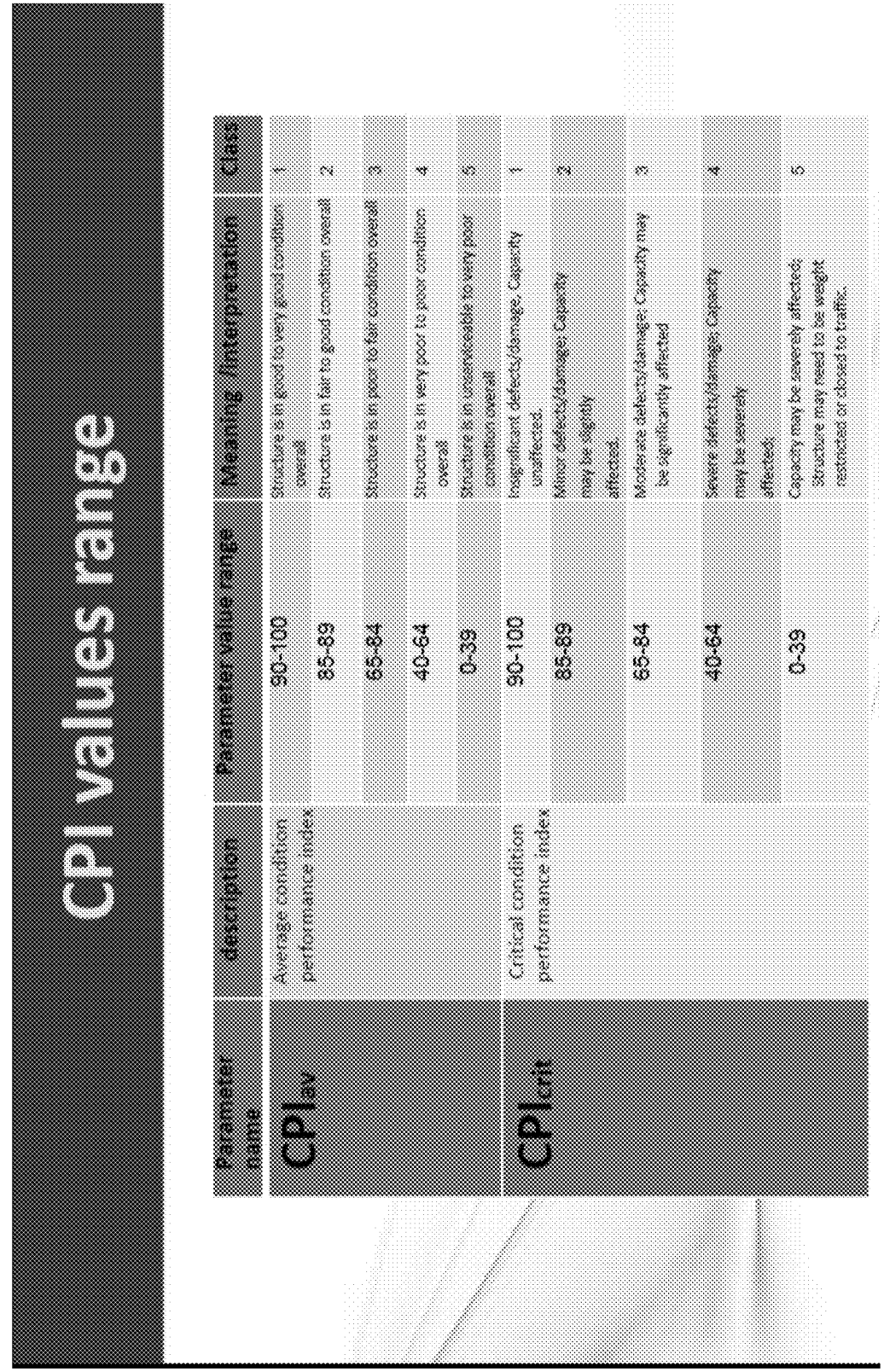
FIG. 9 is a table that lists the scaling of defect severity in and impact on a construction or structure.

In step (1020) structure score and ranking are implemented based on the previous step (1010) of defect identification. For this, parametric scoring methodology may be applied by defining particular parameters that determine the gravity of a defect and its impact on the strength, durability and performance of the bridge. Based on the given grading, the two indices of Critical Condition Performance and Average Condition Performance are calculated. The numeric scaling of these indices and assignment of severity and impact are listed in the table presented in FIG. 9. Particularly, the numeric grading is divided to classes, each class relating to a selected range of scoring between 0 and 100. The meaning and interpretation are attached to every range, which enables the user to determine the state and performance of the bridge. The final step (1030) comprises recommending treatment based on the values of the two indices. Priority of treatment may be determined for the bridge and particular defects identified in it. Also predefined parameters may be considered to conclude a known treatment to the defects and bridge as a whole. These actions may also be accompanied by a decision support system that helps the user formulate an optimal treatment plan for the bridge. Step (1010) is also designated B1, which refers to an expansion of step (830), designated B.

The invention claimed is:

1. A method for 3D modeling of a structures, said method comprising:
   (a) obtaining digital 2D images of said structure;
   (b) producing a 3D image from said 2D images of said structure;
   (c) transforming said 3D image to a point cloud presentation of said structure;
   (d) electing a collection of data points from said cloud of data points;
   (e) identifying an object of said structure that matches said collection of data points;
   (f) attaching corresponding visual images to a record of said identified object; and
   (g) repeating steps (a)-(f) to any collection of data points in said cloud of data points until constructing a 3D model based on combination of all identified objects;
   the method further comprises:
   (h) conducting a defect analysis comprising:
      i. characterizing and recording a particular defect examined:
      ii. identifying said defect and location thereof in an object of said 3D model of said structure; and
      iii. assigning a grade and attributes to said defect,
   wherein characterizing and identifying said defect comprises:
      iv. searching through a defect and defect type dedicated digital library for defects with similar characteristics to those attributed to said defect;
      v. comparing said characteristics of said defect and defect type to each other; uploading defects and defect types stored in said dedicated digital library that have characteristics similar to those of said defect;
         selecting the most similar defect-type to said defect and tagging said defect with an identification code designating said defect type,
         wherein identifying said defects or defect type is automatic and based on visual display of known patterns of said defects and defect types in said dedicated digital library, wherein confirmation of identification of said defect or defect type is approved, rejected or corrected by a user, and
         wherein approval, rejection and correction by said user is further recorded, registered in said digital library for any particular defect or defect type and implemented for statistical improvement in identification of defects or defect types.

2. The method of claim 1, wherein said identifying of an object comprises:
   (a) delimiting said collection of said elected data points to match to said object from a library of objects related to said structure;
   (b) calculating probability of each data point to relate to said collection of data points that defines said object identified;
   (c) filtering data points with lesser probability to be related to said object identified;
   (d) recording a relative spatial position of said object identified in said cloud of points.

3. The method according to claim 2, further comprising:
   (a) assigning relative coordinates to every data point and locating said data point in space relative to other data points in its vicinity; and
   (b) assigning metadata selected from color and shade to every data point.

4. The method according to claim 2, wherein said filtering further comprises:

(a) comparing between data and metadata of neighbor data points;
(b) calculating probability of relating said neighbor data points to a single object of said structure; and
(c) including said neighbor data points in or rejecting them out of said collection of data points that relate to said object above or below a selected threshold of probability, respectively.

5. The method according to claim 4, wherein said filtering continues dynamically when matching a pattern of an object to said selected collection of data points until proper match is achieved.

6. The method according to claim 1, wherein number of said data points is in the range of 50 to 500 millions.

7. The method according to claim 1, further comprising:
(a) importing historical 3D model or models constructed in previous stages;
(b) locating 3D images that correspond to a particular object in said 3D model;
(c) display visual, actual part in said structure corresponding to said object;
(d) accessing historical database of previous surveys for comparing visual and grading data; and
(e) systematically guiding a user in a walkthrough approach to identification of said defect.

8. The method according to claim 7, wherein said walk-through approach comprises:
(a) naked-eye, semi-automated or automated defect detection;
(b) uploading a library of defect types for the identification of said defect in real-time; and
(c) providing a decision support system and quality control procedures for obtaining optimal identification and grading of said defect.

9. The method according to claim 1, further comprising recommendation for treatment comprising:
(a) assigning values to selected parameters that define severity of said defect;
(b) weighting these values according to selected weight values assigned for each parameter;
(c) weighting and calculating total weighted value and assessing impact of said defect on strength, durability and performance of said structure.

10. The method according to claim 9, further comprising:
(a) observing all defects in all objects of said 3D model of said structure;
(b) weighting said defects together to obtain total strength, durability and performance of said structure; and
(c) producing Critical Condition Performance Index and Average Condition Performance Index for all defects combined for assessing impact of any selected defect of said defects on strength, durability and performance on said structure.

11. The method according to claim 1, wherein said structure are is selected from bridges, highways, roads, railways, pavements, above- and under-ground piping, facilities, plants, buildings and towers.

12. A system for 3D modeling of a structure, said system comprising:
(a) remotely operated and controlled light aerial UAV (Unmanned Aerial Vehicle);
(b) high-resolution digital photographing means mounted on said UAV, said high-resolution ranges between 50 to 100 up to 500 million data points;
(c) detection devices and orientation geo-location devices mounted on said UAV, said detection devices are configured to locate and identify said structure selected for survey;
(d) remote control and data processing unit in communication with UAV, said remote control and data processing unit are configured to produce flight mission for said UAV and instructions for mapping and grating said structure to be surveyed;
(e) digital storing means for storing 2D images of said structure taken by said digital photographing means;
(f) digital data processing means for retrieving said stored 2D images and constructing a 3D image of the structure based on said 2D images;
(g) means for transforming said 3D image to a cloud of data points;
(h) digital library of 3D patterns of typical objects matching parts of said structure;
(i) means for matching a pattern of an object of said structure to a selected collection of data points in said cloud of data points; and
(j) digital data processing means for constructing a 3D model of said structure based on said matching of 3D objects to said cloud of data points;
(k) an evaluation module for evaluating severity of a defect in said structure, said evaluation module is configured to visually identify said defect in any mode selected from naked-eye, semi-automatic and automatic identification, accumulating information on the correspondence between type of a defect and possible visual representation of such defect, providing selected possible types of defects according to said images provided by said visual identification means and providing conclusion of the type of defect to a user; and
(l) a recommendation module for recommending treatment following evaluation of said defect, said recommendation module is configured to assign values to selected parameters that define severity of said defect, weighing these values according to selected weight values for each parameter, weighting and calculating total value and assessing impact of said defect on strength, durability and performance of said structure.

13. The system according to claim 12, wherein said recommendation module is configured to accumulate contribution of all defects observed and weight them together to obtain total strength, durability and performance of said structure.

14. The system according to claim 12, wherein said evaluation and recommendation further comprise manufacturing of a grading sheet for said structure, said grading sheet listing said defects identified, severity, quantity and description thereof for every object in said 3D model, said grading sheet further listing images of particular parts of said structure corresponding to particular objects with said list of defects.

15. The system according to claim 12, wherein said detection devices are selected from IR sensors, Lidar, GPS means.

16. The system according to claim 12, wherein said structure is selected from bridges, highways, roads, railways, pavements, above- and under-ground piping, facilities, plants, buildings and towers.

\* \* \* \* \*